United States Patent
Zhou

(10) Patent No.: US 9,956,753 B2
(45) Date of Patent: May 1, 2018

(54) LINING MATERIAL OF BAGS AND LUGGAGE AND PROCESSING METHOD

(71) Applicant: Shizhi Zhou, Guangdong (CN)

(72) Inventor: Shizhi Zhou, Guangdong (CN)

( * ) Notice: Subject to any disclaimer, the term of this patent is extended or adjusted under 35 U.S.C. 154(b) by 289 days.

(21) Appl. No.: 14/754,698

(22) Filed: Jun. 30, 2015

(65) Prior Publication Data

US 2016/0076758 A1    Mar. 17, 2016

(30) Foreign Application Priority Data

Sep. 15, 2014  (CN) .......................... 2014 1 0467148

(51) Int. Cl.
| | |
|---|---|
| *F21V 33/00* | (2006.01) |
| *B32B 37/14* | (2006.01) |
| *B32B 5/02* | (2006.01) |
| *F21V 8/00* | (2006.01) |

(52) U.S. Cl.
CPC .............. *B32B 37/14* (2013.01); *B32B 5/02* (2013.01); *G02B 6/001* (2013.01); *B32B 2553/00* (2013.01)

(58) Field of Classification Search
CPC ....... B32B 5/02; B32B 37/14; B32B 2553/00; G02B 6/001
See application file for complete search history.

(56) References Cited

U.S. PATENT DOCUMENTS

2007/0133195 A1* 6/2007 Gorton ................... A45C 15/06
                                                                362/156

OTHER PUBLICATIONS

Machine traslated CN 203282760.*

* cited by examiner

*Primary Examiner* — Vishal I Patel

(57) ABSTRACT

The invention concerns a processing method of lining material for bags and luggage comprising: preparing a fabric; bonding the lightguide fiber on the fabric surface; coating a fluorescent layer on the fabric surface with lightguide fiber; setting a nano-antibiotic silicone layer on the fluorescent; setting the LED luminous tube and driving power at the end of the lightguide fiber. In this way, the first layer of the lining material is a nano silicone layer, the second the fluorescent layer, the third the fabric, a lightguide fiber between the second and third layer, LED luminous tube at the initial end of the lightguide fiber, which to light the luggage interior with the guiding characteristic of fiber by lighting up the LED.

3 Claims, 1 Drawing Sheet

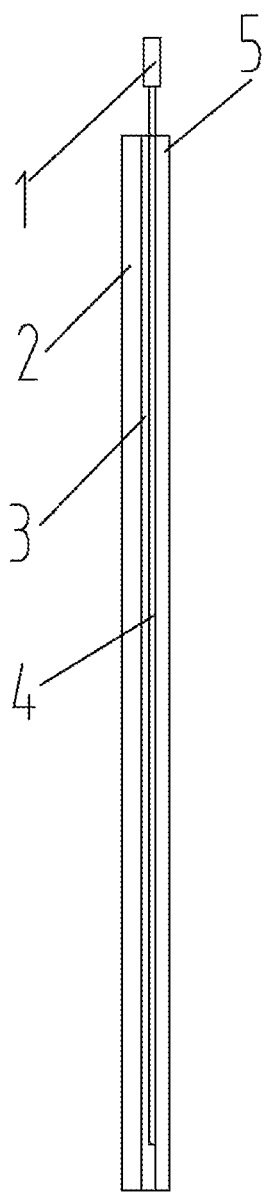

LINING MATERIAL OF BAGS AND LUGGAGE AND PROCESSING METHOD

BACKGROUND OF THE INVENTION

The invention relates to bags and luggage products, in particular relates to the lining material of bags and luggage and processing method.

With current technology level, the lining material of bags and luggage is generally a single layer of fabric which has defects of: easily polluted and bacteria-harbored fabric surface in course of time; inconvenient for cleaning and washing; and invisibility of objects in the bag and luggage.

BRIEF SUMMARY OF THE INVENTION

The invention aims to provide a lining material for bags and luggage and processing method, which is featured with antibiotic characteristic and easy to find objects in bags and luggages.

It provides a processing method of lining material of bags and luggages comprising: preparing a fabric; bonding the lightguide fiber on the fabric surface; coating a fluorescent layer on the fabric surface with lightguide fiber; setting a nano-antibiotic silicone layer on the fluorescent; setting the LED luminous tube and driving power at the end of the lightguide fiber.

A processing method as claimed, wherein the nano-antibiotic silicone may be formed on the surface of the fluorescent layer through molding according to the size of luggage interior. Whereby the thickness of nano-antibiotic silicone should be between 0.2-1 mm.

A processing method as claimed, wherein the nano-antibiotic silicone should be processed with proportion of silicone 92%, antibacterial and antifungal agent 2%, nano silver-ion inorganic agent 3%, crosslinking agent 3%. Whereby put the crosslinking agent into high tear resistance fumed silicone and mix for 5 minutes in open mill at normal temperature to form sheet shape where outputs biopolymer; wherein the antibacterial and antifungal agent and nano silver-ion inorganic agent intensively mixed as proportioned produces binary mixtures; whereby evenly add the binary mixture into biopolymer of sheet shape and roll the biopolymer containing binary mixture into multilayer cylinder shape which is closed at both ends and squashed by roller; whereby put the squashed biopolymer into the open miller, heat up to 45° C. and mix for 8 minutes. During the mixing, new polymer is produced after 8 minutes of chemical reaction among macromolecular of quaternary, which is the basic maternal after the changing of chemical properties of silicone and before the production of new material; whereby weigh and slice the polymer according to the capacity of product mold. Heat up the flat vulcanizing machine to 150° C. and set the chemical reaction time of the machine to 4 minutes before adding the sliced and weighed polymer into the product mold to start the vulcanization; whereby the macromolecular of polymer in the machine produce chemical reaction through pressure, temperature and time element, whereafter 4 minutes of colliding, fission and fusion, it produces sheet material of antibacterial silica gel of nano-silver silicone after cooling down and removing from the mold.

A lining material of bags and luggage as claimed, comprising several layers of materials, which includes the fabric layer; the lightguide fiber bonding on the surface of the fabric; the fluorescent layer set on the fabric surface; the nano antibiotic silicone set on the surface of fluorescent layer.

A lining material of bags and luggage as claimed comprising LED luminous tube and driving power at the ends of lightguide fiber.

The invention is a new type of material to replace traditional lining material of bags and luggages which comprises three layers, the first layer of the lining material is a nano silicone layer, the second the fluorescent layer, the third the fabric, a lightguide fiber between the second and third layer, LED luminous tube at the initial end of the lightguide fiber, which to light the luggage interior with the guiding characteristic of fiber by lighting up the LED.

The invention has advantages of: the first layer of nano-silicone inhibits bacterial growth and serves as traditional lining fabric which can be pulled out of bag and luggage when cleaning is needed due to the characteristics of silicone. Besides, the applying silicone interior is waterproofing. The silicone lining with waterproofing make it possible to wash the interior of bag and luggage, even liquid leakage will not pollute the external leather material. The second fluorescent layer of the lining lighting up the interior of bag and luggage without lighting source improves the grade of bag and luggage and represent technology. The molding silicone lining on the fabric surface to be customed according to the size of bag and luggage improves production efficiency only by leaving the same sewing amount of external leather to external fabric. The third fabric layer serves to bond the external leather layer.

BRIEF DESCRIPTION OF THE DRAWINGS

FIG. 1 illustrates the section view of the lining material of bags and luggages.

DETAILED DESCRIPTION OF THE INVENTION

According to FIG. 1: a processing method of lining material for bags and luggages comprising: preparing a fabric; bonding the lightguide fiber on the fabric surface; coating a fluorescent layer on the fabric surface with lightguide fiber; setting a nano-antibiotic silicone layer on the fluorescent; setting the LED luminous tube and driving power at the end of the lightguide fiber.

A processing method as claimed, comprising the liner package of nano-antibiotic silicone directly connects to external parts of the bags and luggages, wherein the nano-antibiotic silicone may be formed on the surface of the fluorescent layer through molding according to the size of luggage interior. Whereby the thickness of nano-antibiotic silicone should be between 0.2-1 mm.

A processing method as claimed, wherein the nano-antibiotic silicone should be processed with proportion of silicone 92%, antibacterial and antifungal agent 2%, nano silver-ion inorganic agent 3%, crosslinking agent 3%. Whereby put the crosslinking agent into high tear resistance fumed silicone and mix for 5 minutes in open mill at normal temperature to form sheet shape where outputs biopolymer; wherein the antibacterial and antifungal agent and nano silver-ion inorganic agent intensively mixed as proportioned produces binary mixtures; whereby evenly add the binary mixture into biopolymer of sheet shape and roll the biopolymer containing binary mixture into multilayer cylinder shape which is closed at both ends and squashed by roller; whereby put the squashed biopolymer into the open miller, heat up to 45° C. and mix for 8 minutes. During the mixing, new polymer is produced after 8 minutes of chemical reaction among macromolecular of quaternary, which is the basic maternal after the changing of chemical properties of silicone and before the production of new material; whereby weigh and slice the polymer according to the capacity of product mold. Heat up the flat vulcanizing machine to 150° C. and set the chemical reaction time of the machine to 4 minutes before adding the sliced and weighed polymer into the product mold to start the vulcanization; whereby the macromolecular of polymer in the machine produce chemical reaction through pressure, temperature and time element, whereafter 4 minutes of colliding, fission and fusion, it produces sheet material of antibacterial silica gel of nano-silver silicone after cooling down and removing from the mold.

Provide a lining material of bags and luggage, comprising several layers of materials, which includes the fabric layer 5; the lightguide fiber 4 bonding on the surface of the fabric 5; the fluorescent layer 3 set on the fabric surface; the nano antibiotic silicone 2 set on the surface of fluorescent layer 3; LED luminous tube and driving power 1 at the end of lightguide fiber 4. Wherein the nano antibiotic silicone layer is made of antibacterial compound material of nano-silver silicone.

The invention comprises the first layer of the lining material is a nano silicone layer, the second the fluorescent layer, the third the fabric, a lightguide fiber between the second and third layer, LED luminous tube at the initial end of the lightguide fiber, which to light the luggage interior with the guiding characteristic of fiber by lighting up the LED. The fluorescent layer absorbs lights and automatically gives out lights.

What is claimed is:

1. A processing method of lining material for bags and luggages, comprising the following steps:
    1) preparing a fabric;
    2) bonding a lightguide fiber on a surface of the fabric;
    3) coating a fluorescent layer on the fabric with the lightguide fiber;
    4) setting a layer of nano-antibiotic silicone on the fluorescent layer;
    5) setting an LED luminous tube and driving power at an end of the lightguide fiber.

2. A processing method as in claim 1, wherein the nano-antibiotic silicone is formed on a surface of the fluorescent layer through molding according to a size of luggage interior, wherein the layer of nano-antibiotic silicone as formed has a thickness between 0.2-1 mm.

3. A processing method as in claim 1, wherein the nano-antibiotic silicone has 92% silicone, 2% antibacterial and antifungal agent, 3% nano silver-ion inorganic agent, and 3% crosslinking agent; the nano-antibiotic silicone is prepared according to following method:
    adding the crosslinking agent into a high tear resistance fumed silicone and mixing the crosslinking agent and the high tear resistance fumed silicone for 5 minutes in an open mill at normal temperature to output a biopolymer having a sheet shape;
    mixing the antibacterial and antifungal agent and a nano silver-ion inorganic agent intensively as proportioned to obtain a binary mixture;
    adding the binary mixture into the biopolymer evenly and rolling the biopolymer containing the binary mixture into a cylinder having multiple layers;
    closing both ends of the cylinder and squashing the cylinder by using a roller;
    transferring the squashed biopolymer into the open mill, heating up the open mill to 45° C. to process the squashed biopolymer for 8 minutes, resulting in a modified polymer after 8 minutes of chemical reaction among macromolecular of quaternary, wherein the modified polymer is a preform of the nano-antibiotic silicone obtained by changing chemical properties of silicone;
    weighing and slicing the modified polymer according to a capacity of a product mold;
    heating up a vulcanizing machine to 150° C. and setting a chemical reaction time in the vulcanizing machine to be 4 minutes;
    adding the sliced and weighed modified polymer into the product mold to start vulcanization; wherein macromolecular of the modified polymer in the vulcanizing machine chemically react according to pressure, temperature and time factors; after 4 minutes of colliding, fission and fusion, cooling down and then removing the mold to obtain a sheet material of antibacterial silica gel of nano-silver silicone.

* * * * *